United States Patent [19]

Soileau, Jr. et al.

[11] Patent Number: 4,846,561

[45] Date of Patent: Jul. 11, 1989

[54] MONOLITHIC OPTICAL POWER LIMITER BASED ON TWO-PHOTON ABSORPTION

[75] Inventors: Marion J. Soileau, Jr.; Eric W. Van Stryland, both of Orlando, Fla.

[73] Assignee: The United States of America as represented by the Secretary of the Army, Washington, D.C.

[21] Appl. No.: 210,476

[22] Filed: Jun. 21, 1988

[51] Int. Cl.$^4$ ............................ G02B 5/23; G02F 1/01; G02F 1/29

[52] U.S. Cl. ..................................... 350/354; 350/363; 350/381; 350/390

[58] Field of Search ................. 350/354, 363, 381, 390

[56] References Cited

U.S. PATENT DOCUMENTS

| | | | |
|---|---|---|---|
| 3,395,961 | 8/1968 | Ready | 350/354 |
| 3,790,252 | 2/1974 | Pao | 350/354 |
| 4,410,239 | 10/1983 | Kaplan et al. | 350/390 |
| 4,776,677 | 10/1988 | Park et al. | 350/354 |

Primary Examiner—Eugene R. Laroche
Assistant Examiner—Michael Shingleton
Attorney, Agent, or Firm—Milton W. Lee; Aubrey J. Dunn; Anthony T. Lane

[57] ABSTRACT

Collimated incident optical radiation which might contain high-intensity or high-power radiation is focused into the body of a limiter by a first lens formed at one end of the limiter. The body is a cylinder of revolution with an axis along the optical axis between radiation and a sensitive detector. Radiation of normal intensity or power freely passes through the body and is recollimated by a second lens formed at the other end of the limiter from the first lens. The body is made of material which is subject to two-photon absorption such that high-intensity or high-power radiation undergoes absorption and is consequently self-defocused such that it is diverted from the optical path. For visible light, the material may be ZeSe or ZnS; for ultraviolet, copper chloride; for infrared, HgCgTe.

6 Claims, 1 Drawing Sheet

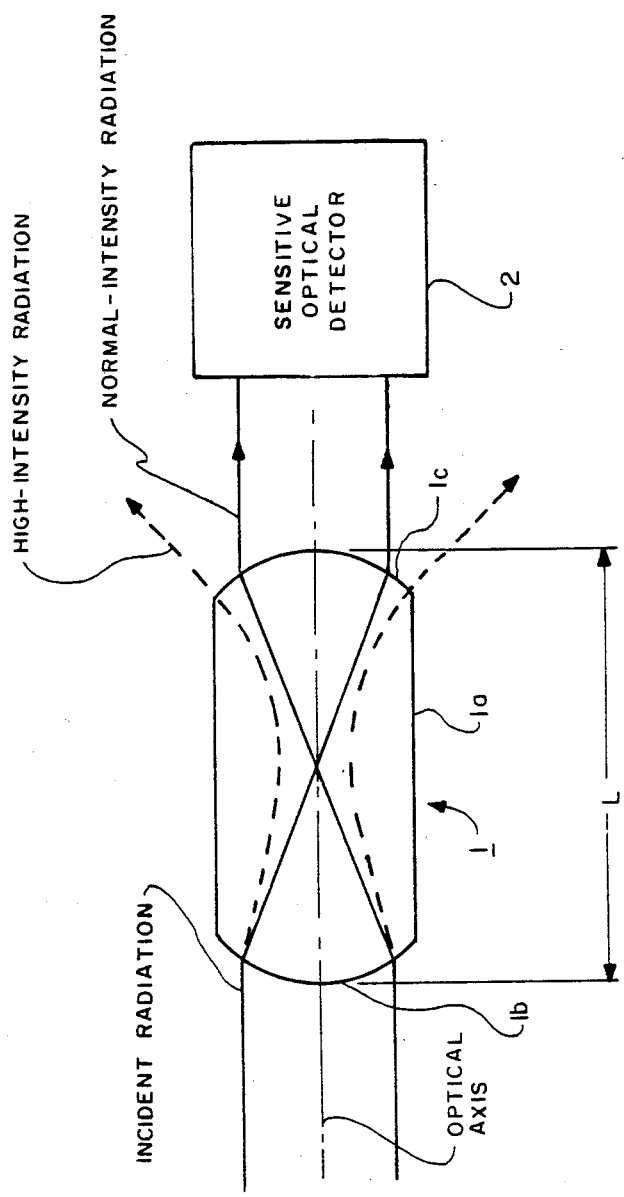

MONOLITHIC OPTICAL POWER LIMITER BASED ON TWO-PHOTON ABSORPTION

The invention described herein may be manufactured, used, and licensed by the U.S. Government for governmental purposes without the payment of any royalties thereon.

BACKGROUND OF INVENTION

This invention is in the field of protectors for sensitive optical detectors against high-power or high-intensity radiation. Such protectors are also known as optical power limiters and take many forms, such as mechanical or electro-optic shutters, plasma devices, bleachable filters, exploding or fusing mirrors, interference filters (for lasers), and nonlinear optical materials in various configurations. Optical phenomena such as blocking, absorbing, reflecting, scattering, and defocusing are used to advantage in such limiters. Whereas most of the known limiters are for protection against visible light, the instant invention is usable with visible, ultraviolet, or infrared radiation using various materials which exhibit two-photon absorption. One of the materials capable of two-photon absorption of infrared radiation used in this invention is the same as that used by the present inventors and others in U.S. patent application Ser. No. 07/213873, filed June 30, 1988.

SUMMARY OF THE INVENTION

The invention is an optical power limiter for protecting sensitive optical detectors against high-power or high-intensity optical radiation and primarily consists of a relatively thick optical material capable of two-photon absorption with subsequent self-defocusing. For infrared radiation wavelengths, the material is $Hg_{1-x}Cd_xTe$, wherein x is less than one and is adjusted for the radiation wavelength. For visible wavelengths, ZnSe and ZnS may be used, and copper chloride may be used for ultraviolet. Incident radiation directed into the material, at normal power or energy levels, mostly transmits through the material. At high-power or high-energy radiation levels, however, the material experiences two-photon absorption with subsequent self-focusing of the radiation, and the radiation transmitted is limited to some threshold level.

BRIEF DESCRIPTION OF THE DRAWING

The single drawing FIGURE is a schematic showing of the preferred embodiment of the invention.

DESCRIPTION OF PREFERRED EMBODIMENT

The invention may be best understood when this description is taken in conjunction with the drawing. Before referring to the drawings, however, a discussion of the theory of the invention is in order. There exists tertiary materials (such as HgCdTe) and binary materials such as ZnSe, ZnS, and copper chloride, which are subject to two-photon absorption. The bandgap of tertiary compounds such as HgCdTe can be altered or adjusted by the proper proportions of Hg and Cd. These materials have bandgaps greater than the energy corresponding to a particular incident radiation wavelength, such that photons of this wavelength are not absorbed at power or energy levels too low tocause optical damage to the detector. At high intensities, however, the probability of simultaneously absorbing two photons greatly increases, and two photons together will have enough energy to carry an electron across the bandgap. Consider, as an example, radiation in the 8–12 $\mu$m wavelength band. In order to have two-photon absorption out to 12 $\mu$m, the bandgap must be no larger than 200 meV. This corresponds to a single-photon absorption at 6 $\mu$m wavelength or less. Therefore, at low intensity levels, the material will be transparent for wavelengths of 6 $\mu$m or greater, but at high intensities, the material will be absorbing (via two-photon absorption) from 6 $\mu$m to 12 $\mu$m wavelength.

Whenever a narrow-bandgap material is used in optics, it is important to consider the effects of temperature on the material's optical properties. At room temperature, enough electrons may be thermally excited across the bandgap to cause considerable absorption. The transmission at low intensity levels can be enhanced by making the material "thin" or by cryogenically cooling the material. The term "thin" here refers to the relative thickness of the material compared to the distance from the focus over which the beam area doubles. Unfortunately, making the material "thin" has its disadvantages. Since optical damage to a solid surface occurs at lower amplitude or power intensities than in the bulk of the solid, the possibility of surface damage must be considered. The device with thin material will not tolerate very high intensity radiation (a necessary requirement for two-photon absorption), and the resulting dynamic range of such a device is small. These disadvantages may be avoided by making a relatively "thick" device. This is what is taught in the invention referred to above. The input beam of that invention is focused in the material bulk far away from the surfaces thereby reducing the intensity on the surface. The instant invention greatly decreases the radiation intensity at the material surface by forming the surface itself to act as a lens, rather than using an external lens to focus radiation into the material. To protect the device from damage in the bulk, thermal defocusing is encouraged by using a material whose bandgap increases with increasing temperature. In order to have good transmission at low intensities, a narrow-bandgap material will need to be cooled. If a narrow-bandgap material is used as a limiter for a detector, it is likely that the detector will also be made of a narrow-bandgap material and need to be cooled in order to reduce the noise level. Cooling the limiter may therefore just be an extension of the detector cooling.

The physical mechanism governing the behavior of the device can be described as follows: a high-intensity threat radiation beam is focused by an integral lens into the bulk of the device. Electrons are excited across the bandgap by two-photon absorption and become free electrons. This reduces the number of electron resonators contributing to the index of refraction, and the index of refraction is consequently reduced. The threat beam's spatial intensity profile at the focus is most likely nonuniform, being greatest at the center and decreasing out radially. This will produce the largest index change at the center of the beam spot. This in turn makes the material operate as a negative focal length lens (concave). Hence, the thread radiation will diverge (self-defocus).

It turns out that the thermal index change is much larger than the free-electron index change described above. A large number of free conduction band electrons are able to absorb single photons, which leads to heating and causes the bandgap to change. This can occur in less than a nanosecond and the index of refraction will be affected on this time scale as well. In most materials the bandgap gets smaller with an increase in temperature; this is undesirable because the index of refraction increases for the bandgap decrease. This temperature-related increase of index will dominate any index change introduced by high-intensity radiation of a beam, and the beam will self-focus. Such a self-focused beam will damage a relatively thick solid material in the bulk. Fortunately, HgCdTe, is a material whose bandgap increases with an increase in temperature. This will lower the index of refraction and aid in defocusing the beam, such that damage will not occur in the material bulk. To enhance the dynamic range, the device should be at least thick enough for the beam to focus in the bulk of the material. In the instant invention the device thickness is twice the focal length of its integral lenses. The x in $Hg_{1-x}Cd_xTe$ is determined by the following formula (where Eg is energy gap, and T is temperature in degrees Kelvin):

$$Eg = -0.302 + 1.93x + 5.35(10^{-4})T(1-2x) - 0.810x^2 + 0.832x^3$$

Table I below gives examples of x for various wavelengths and temperatures.

TABLE I

| WAVE-LENGTH (MICRONS) | Eg(meV) | x (T = 10K) | x (T = 77K) | x (T = 300K) |
|---|---|---|---|---|
| 12 | 103 | 0.225 | 0.212 | 0.162 |
| 10 | 124 | 0.237 | 0.225 | 0.177 |
| 8 | 155 | 0.256 | 0.245 | 0.199 |
| 5 | 248 | 0.312 | 0.304 | 0.267 |
| 4 | 310 | 0.349 | 0.342 | 0.313 |
| 3 | 413 | 0.411 | 0.407 | 0.389 |

Turning now to the drawings, we see the inventive device inserted on the optical path between incoming radiation and a sensitive optical detector. The device is generally designated by reference numeral 1, is a material subject to two photon absorption, and is made in the form of a closed cylindrical body 1a, with curved ends 1b and 1c. The curved ends are spherical lenses of equal focal lengths. The length L of the device is twice the focal length of each lens. The device is preferably a body of revolution about the optical axis between the radiation and the detector, and thus has a longitudinal axis colinear with the optical axis. Incident collinated radiation of normal intensity, as shown by the solid rays, is focused by 1b into body 1a of the device, transmits 1a, and is recollimated by 1c before passing on to detector 2. High-intensity incident radiation, however, undergoes self-defocusing because of two-photon absorption, and follows the paths of the dotted line rays. An appropriate material is chosen for the device, in accordance with the wavelength of the incident radiation. For visible wavelengths, ZnSe or ZnS are usable; for ultraviolet wavelengths, copper chloride is usable; and for infrared wavelengths, the material is $Hg_{1-x}Cd_xTe$, with x determined as explained above. For ZnSe, we have found that the threshold level, i.e., the level at which limiting by two-photon absorption occurs, is at an energy level of 10 nJ. The particular width of the device is not critical; it must be at least as wide as the incident radiation beam. Depending upon the particular material used, the device may be made by molding and/or grinding and polishing.

The advantages of the invention as described above include:
1. Wide field of view
2. Response for a large number of input wavelengths
3. High linear transmission over a large spectral range
4. Fast response (on the order of picoseconds)
5. Completely passive
6. Extremely low "switch off" of the limiting point
7. Large dynamic range (for thick embodiments)
8. Minimum image distortion
9. Simplicity, since it is a unitary (monolithic) device
10. Versatility, since it essentially does not effect normal radiation, it can be inserted as desired along an optical path, either in newly-designed optical systems, or retrofitted into existing optical systems.

We claim:

1. A unitary device for protecting a sensitive optical detector from high-power or high-intensity radiation of a particular wavelength or band of wavelengths, wherein said device is in the form of a cooled cylindrical body with a longitudinal axis and with positive lenses on either end of said body along said axis, whereby said body is made of a material subject to two-photon absorption of incident radiation and is chosen from the group consisting of: ZnSe, ZnS, copper chloride, and $Hg_{1-x}Cd_xTe$, and whereby said body is placed with its axis colinear with the optical axis is an optical system such that incident radiation below a threshold intensity or power level mostly transmits through said body but incident radiation above said level undergoes two-photon absorption with consequent self-defocusing in said body whereby the self-defocussed radiation is diverted from said detector, and the radiation which transmits through said body is limited to said threshold level.

2. The device as set forth in claim 1 wherein the length of said body is twice the focal length of said lenses.

3. The device as set forth in claim 1 wherein x is determined from the following formula:

$$Eg = -0.302 + 1.93x + 5.35(10^{-4})T(1-2x) - 0.810x^2 + 0.832x^3$$

and wherein Eg is the energy gap corresponding to said particular wavelength and T is temperature in degrees Kelvin.

4. The device as set forth in claim 2 wherein x is determined from the following formula:

$$Eg = -0.302 + 1.93x + 5.35(10^{-4})T(1-2x) - 0.810x^2 + 0.832x^3$$

and wherein Eg is the energy gap corresponding to said particular wavelength and T is temperature in degrees Kelvin.

5. A unitary device for protecting a sensitive optical detector from high-power or high-intensity radiation of a particular wavelength or band of wavelengths, wherein the device is of a cooled material subject to two-photon absorption of incident radiation and wherein the material is a body of revolution with a length L along an optical axis between said radiation and said detector, and includes a first end formed as a lens for focusing collimated incident radiation as a spot into said body, and a second end formed as a lens for recollimating radiation which transmits through said body onto said detector, whereby high-power or high-intensity radiation of said particular wavelength or band of wavelengths is self-defocused by said material.

6. The device as set forth in claim 5 wherein said lenses have the same focal length and wherein L is equal to twice the focal length of each lens.

* * * * *